*INVENTOR*
E. BIERMAN
AGENTS
Cuphey & Erickson

July 21, 1970 E. BIERMAN 3,521,004

SELF-STEERING SWITCHING SYSTEM

Filed July 5, 1968 2 Sheets-Sheet 2

INVENTOR
E. BIERMAN
AGENTS
Curphey & Erickson

3,521,004
SELF-STEERING SWITCHING SYSTEM

Eric Bierman, Toronto, Ontario, Canada, assignor to Northern Electric Company Limited, Montreal, Quebec, Canada Filed July 5, 1968, Ser. No. 748,111
Int. Cl. H04q 3/42
U.S. Cl. 179—18 5 Claims

ABSTRACT OF THE DISCLOSURE

The preferred embodiment of this invention is a multi-stage switching network using, for example, crossbar switches as the switching elements. A path through the network is established on a self-steering basis by marking both ends of the network. A preference circuit selects idle links between stages on a priority basis through the off-normal contacts of the hold magnets in the crossbar switches. A busy indicating relay is provided to prevent selection of an idle link to a switching element all of whose links to a subsequent stage are busy. Once an idle link has been selected, and the associated select magnet operated, the select magnet is locked up by an auxiliary lock relay. This avoids release of the chosen link in the event that a previously busy hold magnet of higher priority becomes idle. Once an idle path has been found through all stages of the network, a marking potential at the terminating end of the network operates the hold magnets for the chosen select magnets to close a crosspoint in each stage.

Figure 1:
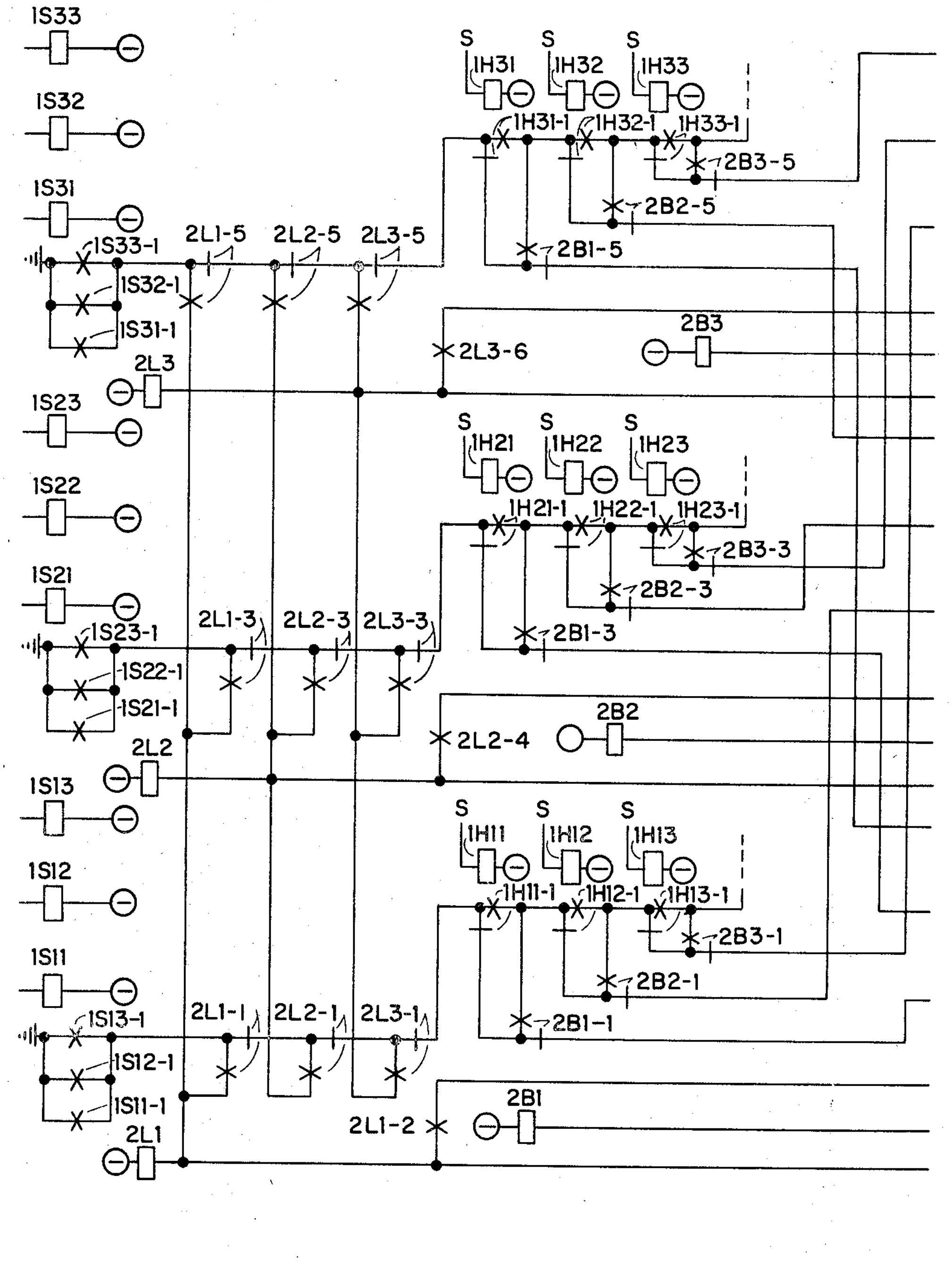

This invention relates to automatic switching systems and more particularly to switching systems using the self-steering principle.

In many known switching systems, using crossbar switches the control of the crossbar switches is effected by a centralized common control equipment having direct access to the various switching stages of the system. However, British specification No. 739,905 discloses a system using a so-called self-steering principle which avoids the use of the centralized common control equipment. The self-steering principle enables two points to be connected together over a multi-stage switching network by marking both ends of the switching network. The selection of an idle path from one stage to the following stage is done automatically. However, the selection of an idle path from one stage in the network to a following stage presents a few problems. Assuming that the selection of an idle link is made by a preference circuit which energizes the first idle link on a priority basis it may very well happen that such first idle link leads to a switching element (i.e. a crossbar switch) whose outgoing paths to a third switching stage are all busy thus causing unnecessary blocking when other links leading to switching elements having idle outgoing paths are available.

To overcome this problem it has been proposed in the prior art to energize all the idle links to the next stage. This avoids unnecessary blocking but, when carried out over a number of succeeding stages, causes the operation of a large number of select magnets of the crossbar switches at once and consequently requires a more elaborate power supply. Also the unnecessary operation of the select magnets decreases their useful life.

The disadvantages of the prior self-steering switching network are overcome, in accordance with the present invention, by providing a busy indicating relay for each switching element in a following stage which prevents selecting an idle link to a busy switching element.

When using the hold magnet off-normal contacts of the crossbar switch to indicate whether or not a link is idle as it is done in our preferred embodiment of the invention, a secondary problem is encountered. After a select magnet has operated to a lower priority link for example, the higher priority one being busy on another call, and the self-steering connection is partially completed, the call on the higher priority link may be terminated causing the hold magnet to release and a higher priority select magnet to operate because the release of the hold magnet off-normal contacts removes the operating path from the lower priority link and applies it to the higher priority link. Consequently some means of locking up the chosen select magnet and locking out all the others is required. This means may be provided by additional contacts on the select magnets or by an auxiliary lock relay. An auxiliary lock relay is used in the preferred embodiment of the invention.

Figure 2:
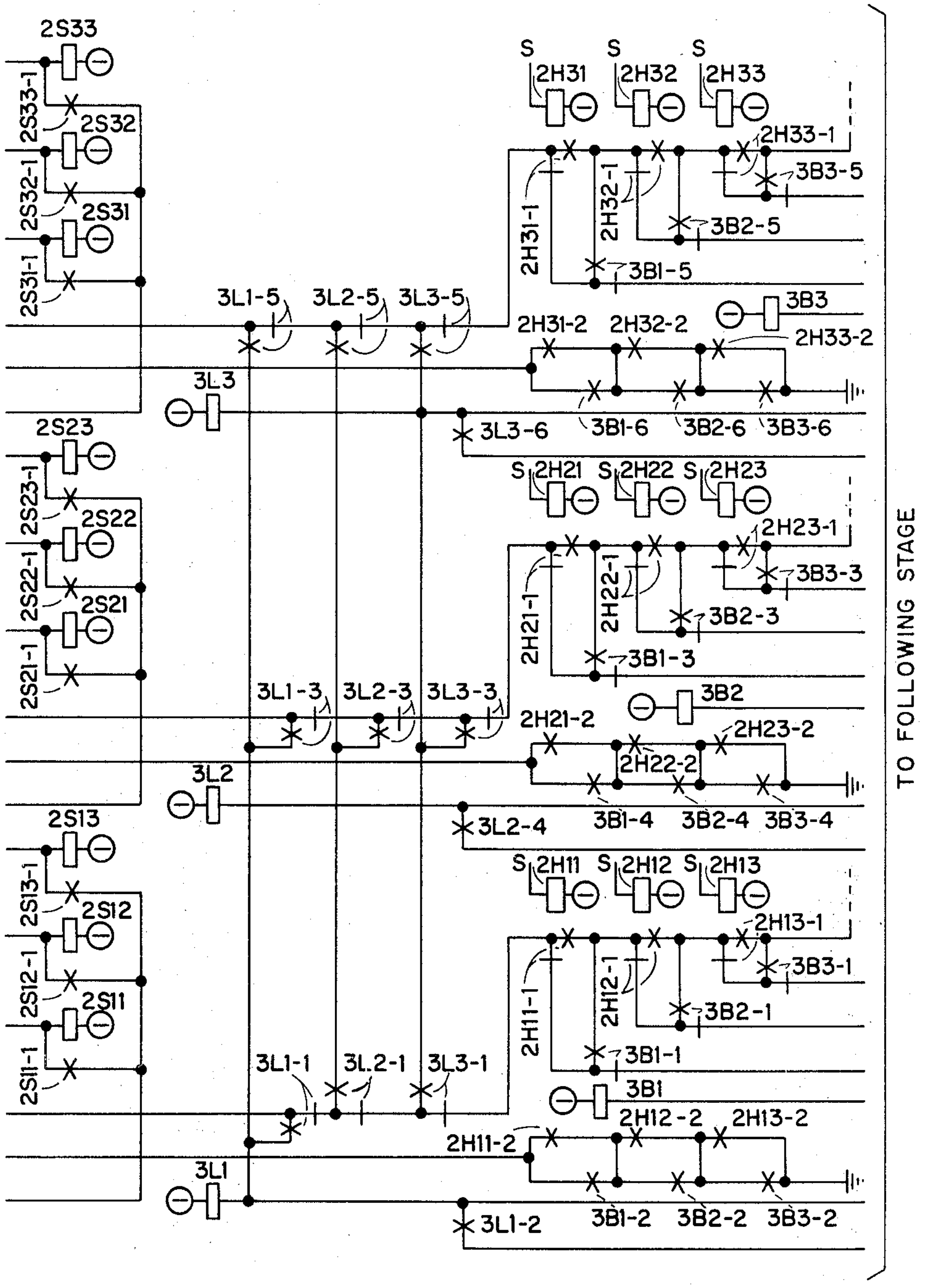
Figure 3:
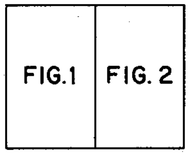

The invention will now be described with reference to a preferred embodiment thereof with no intention however to limit the scope of the invention thereto, the said embodiment being illustrated in the appended drawings in which:

FIGS. 1 and 2 are circuit schematics of portions of a self-steering switching network in accordance with the invention; and FIG. 3 shows the manner in which FIGS. 1 and 2 should be arranged.

In the drawings, there is shown a two stage switching network, each stage having three switching elements and each switching element being a crossbar switch having three select magnets and three hold magnets. The number of stages is usually greater than two but only two have been shown to simplify the description. Similarly each stage may comprise more than three switching elements and each switching element usually has ten select magnets and ten or twenty hold magnets. In the drawings the select magnets S and the hold magnets H are identified as 1S or 1H and 2S or 2H depending on the switching stage they belong to. Similarly the third character used to identify the select and hold magnets represents the switch number, and the fourth character represents the select and hold magnet number.

Each switching element in one stage has access to all the switching elements in the following stage. The selection of an idle link or paths from one stage to the next is done through the off-normal contacts of the hold magnets on a priority basis so that if one hold magnet is busy handling, a call a lower priority link is used. For example, if select magnet 1S11 is operated to begin a self-steering connection, contacts 1S11–1 are closed and a ground is normally sent through contacts 2L1–1, 2L2–1 and 2L3–1 (to be described later) through the off-normal contacts 1H11–1 of hold magnet 1H11 and contacts 2B1–1 of relay 2B1 (to be described later) to operate select magnet 2S11 of the second switching stage, that is to the first select magnet of the first switching element of the second stage. If, however, hold magnet 1H11 of the first stage is busy on a call, off-normal contacts 1H11–1 will be operated and the ground will go through operated off-normal contacts 1H11–1 and released off-normal contacts 1H12–1 of hold magnet 1H12 and contacts 2B2–1 (to be disclosed later) to select magnet 2S21 of the second switching element of the second stage. If hold magnet 1H12 is also busy the ground will go to select magnet 2S31 of the third switching element of the second stage and so on.

Let us assume that hold magnet 1H11 was idle and that select magnet 2S11 was the one operated in the second stage. Select magnet 2S11 closes its own contacts 2S11–1 and operates relay 2L1 which locks itself operated with select magnet 2S11 on the original ground through operated contacts 2L1–1 and select magnet contacts 1S11–1. The operation of 2L1–1 also removes the operate path for all the other select magnets of the second stage. Lock relays 2L1, 2L2 and 2L3 prevents any shuffling of select magnets if a busy hold magnet is released as will be described later.

The operation of relay 2L1 also closes contacts 2L1–2 which forwards a ground through normally released contacts 3L1–1, 3L2–1 and 3L3–1 and through the off-normal contacts 2H11–1 and contacts 3B1–1 to the first select magnet of the first switching element of the third stage assuming that hold magnet 2H11 is idle. The first select magnet of the first switching element of the third stage will lock operated with relay 3L1 on the original ground from the first stage through contacts 3L1–1.

If hold magnet 1H11 is busy serving another call, then select magnet 2S21 will be operated and will lock operated with relay 2L2 on the original ground at contacts 1S11–1 through contacts 2L2–1. The original ground will then be forwarded through contacts 2L2–4 normally released contacts 3L1–3, 3L2–3, 3L3–3, off-normal contacts 2H21–1 of hold magnet 2H21, and released contacts 3B1–3 to the second select magnet of the first switching element of the following stage.

In accordance with the main feature of the present invention each stage of the switching network is equipped with a busy indicating relay for each switching element which, as mentioned previously, prevents selecting an idle link to a busy switching element. Such busy indicating relays are identified as 2B1, 2B2 and 2B3 in the first stage because they indicate the busy state of the hold magnets of the second stage. Similarly relays 3B1, 3B2, and 3B3 of the second stage indicate the busy state of the hold magnets of the third stage of the switching network. For example, let us assume that all the outgoing paths of the first switching element of the second stage are busy (2H11, 2H12, and 2H13 operated) and that a ground appears on select magnet 1S11. Such ground should normally operate select magnet 2S11 assuming that hold magnet 1H11 is idle. However, there is no point operating select magnet 2S11 since all its outgoing paths to the third stage are busy. In accordance with the invention, relay 2B1 is operated through off-normal contacts 2H11–2, 2H12–2 and 2H13–2 of operated hold magnets 2H11, 2H12 and 2H13. The operation of relay 2B1 closes contacts 2B1–1 and routes the ground from contacts 1S11–1 of select magnet 1S11 towards select magnet 2S21 of the second switching element of the second stage thereby avoiding unnecessary blocking. Similarly, if the first switching element of the third stage has no idle output path, relay 3B1 will be operated and a ground appearing at off normal contacts 2H11–1 from select magnet 1S11 will be routed to the second switching element of the third stage.

The busy indicating relays 3B1, 3B2 and 3B3 also have contacts 3B1–2, 3B2–2 and 3B3–2, 3B1–4, 3B2–4 and 3B3–4, and 3B1–6, 3B2–6 and 3B3–6 in the operating paths of relays 2B1, 2B2 and 2B3 respectively so that if the outgoing paths of all the switching elements of the third stage are busy, busy relays 2B1, 2B2 and 2B3 of the first stage will be operated to prevent unnecessary operation of the select magnets of the second stage.

A secondary problem is encountered when using the hold magnet off-normal contacts of the crossbar switch to indicate whether or not a link to a following stage is idle. For example assume that 1S11 operates and that 1H11 is busy. The ground from contacts 1S11–1 will pass through operated contacts 1H11–1 and released contacts 1H12–1 as mentioned previously to operate select magnet 2S21. However if hold magnet 1H11 is released while the self-steering connection is partially completed, the operating path of select magnet 2S21 will be opened thereby releasing the connection. To overcome this problem each switching element in one stage is provided with a lock relay which operates with the select magnet of the switching element of the following stage to lock up the operated select magnet. Lock relay 2L1, 2L2 and 2L3 are shown in the first stage and lock relays 3L1, 3L2 and 3L3 are shown in the second stage. In the above example, the operation of select magnet 2S21 closes contacts 2S21–1 and operates relay 2L2 which locks itself and select magnet 2S21 to the original ground from contacts 1S11–1 through contacts 2L2–1. The operation of relay 2L2 also opens the operating path for all the other select magnets of the second stage through the off-normal contacts of the hold magnets of the first stage thereby preventing any shuffling of select magnets if a hold magnet is released before the self-steering connection is completed.

Once an idle path has been found through all the stages of the switching network by operating a predetermined select magnet of a switching element in each stage the marking potential applied at the terminating end of the switching network operates a hold magnet associated with each operated select magnet towards the originating end of the switching network to close a cross-point in each switching element and thus establish a connection through the switching network. This is not disclosed in detail in the present application because it is known in the art and described in the above mentioned British specification 739,905.

What is claimed is:

1. A self-steering switching network comprising:

(a) a plurality of switching stages each having a number of switching elements having select and hold magnets, and each switching element of one stage having links to all the switching elements of the following stage;

(b) means responsive to marking of a select magnet in a switching element of one stage for selecting the first idle link to a select magnet in a switching element of the next stage; and (c) means for preventing the selection of an idle link leading to a switching element whose outgoing links are all busy.

2. A self-steering switching network as defined in claim 1 wherein said means for selecting the first idle link to the next stage is a preference circuit which uses the off-normal contacts of the hold magnets of the switching elements to select the first idle link to the following stage on a priority basis.

3. A self-steering switching network as defined in claim 2 wherein said means for preventing the selection of an idle link leading to a busy switching element comprises a busy indicating relay for each switching element, said busy indicating relay having contacts in said preference circuit for selecting a lower priority link when a higher priority link leads to a busy switching element.

4. A self-steering switching network as defined in claim 1 further including means for locking up the operated select magnet of the selected idle link to prevent shuffling of the select magnets before the self-steering connection is completed.

5. A self-steering switching network as defined in claim 4 wherein said locking means is a lock relay which locks itself and the operated select magnet on the original marking potential and locks out all the other select magnets.

References Cited

UNITED STATES PATENTS 3,406,258 10/1968 Peeters et al.

KATHLEEN H. CLAFFY, Primary Examiner

W. A. HELVESTINE, Assistant Examiner